April 4, 1967   R. N. RONEY   3,312,134
CUTTING DEVICE WITH VIBRATING CUTTER ANVIL
Filed Sept. 29, 1965

INVENTOR.
Richard N. Roney
BY
Ernest D. Hix
ATTORNEY

United States Patent Office 3,312,134
Patented Apr. 4, 1967

3,312,134
CUTTING DEVICE WITH VIBRATING CUTTER ANVIL
Richard N. Roney, Dayton, Ohio, assignor to The Sheffield Corporation, Dayton, Ohio, a corporation of Delaware
Filed Sept. 29, 1965, Ser. No. 491,185
3 Claims. (Cl. 83—349)

This invention relates to cutting devices and more particularly to an ultrasonic assisted cutting device.

It is an object of this invention to provide an improved cutting apparatus for cutting in a rapid and efficient manner materials otherwise difficult to cut.

It is a further object to provide such a cutting apparatus for cutting a moving strip of material including opposed cooperating cutting members relatively movable toward one another for cutting the material interposed therebetween, at least one of said members being simultaneously subjected to vibrations of small amplitudes and ultrasonic frequencies during the cutting operation, whereby cutting force is reduced, more reliable cutting operations are achieved, and life of cutting components is extended.

It is a further object to provide such an apparatus wherein the cutting members are power actuated toward and from one another, and including a magnetostrictive driving unit connected to vibrate one of said members energized at ultrasonic frequencies and minute amplitude by an associated winding to a high frequency generator.

It is a further object to provide a cutting apparatus particularly adaptable to cutting thin papers or the like wherein one of a pair of cooperating members is an anvil and the other is power actuated toward and from the anvil for cutting, power means being operatively connected to vibrate the anvil and the paper supported thereby at ultrasonic frequencies and through an excursion which is such that the cutting member substantially penetrates the paper and does not go into the anvil.

Other objects and advantages of the invention will be apparent from the following description, the appended claims, and the accompanying drawing, in which, FIG. 1 illustrates, partially broken away to central vertical section, an apparatus embodying the present invention, FIG. 2 is an enlarged fragment of the illustration of FIG. 1, FIG. 3 is a view taken substantially along line 3—3 of FIG. 1

The present invention has been illustrated for purpose of disclosing the features of the invention as embodied in an apparatus for cutting a strip of material, such as cigarette paper, into segments. Previously such operations have been exceedingly difficult under continuous feed conditions because of critical adjustments required of the cutter and opposing supporting anvil. If the spacing therebetween is overly great the strip is not completely cut into segments and if the spacing is not great enough the cutting components are continuously impacted against one another with undue force. The present invention overcomes these difficulties while making possible rapid and efficient cutting of these and other ordinarily difficult to cut materials.

While a particular apparatus and amplification has been illustrated for the purpose of disclosing the present invention it will be apparent that other forms of apparatus and other applications can be provided.

In the present invention as cooperating cutting members are moved toward one another into cutting engagement with an interposed strip of material at least one of the members is simultaneously vibrated at extremely high frequencies and through minute amplitudes to aid the cutting operation. In the exemplary embodiment illustrated as a paper strip is continuously fed, a rotatable cutting member cuts the strip into segments through cooperation with an opposed supporting anvil. During the cutting operation the anvil is oscillated or vibrated at ultrasonic frequency through a magnetostrictive driving unit connected thereto. The cutting action is thus ultrasonically aided with material reduction in the required cutting force for a given application and with more reliable cutting results achieved.

Figure 1:
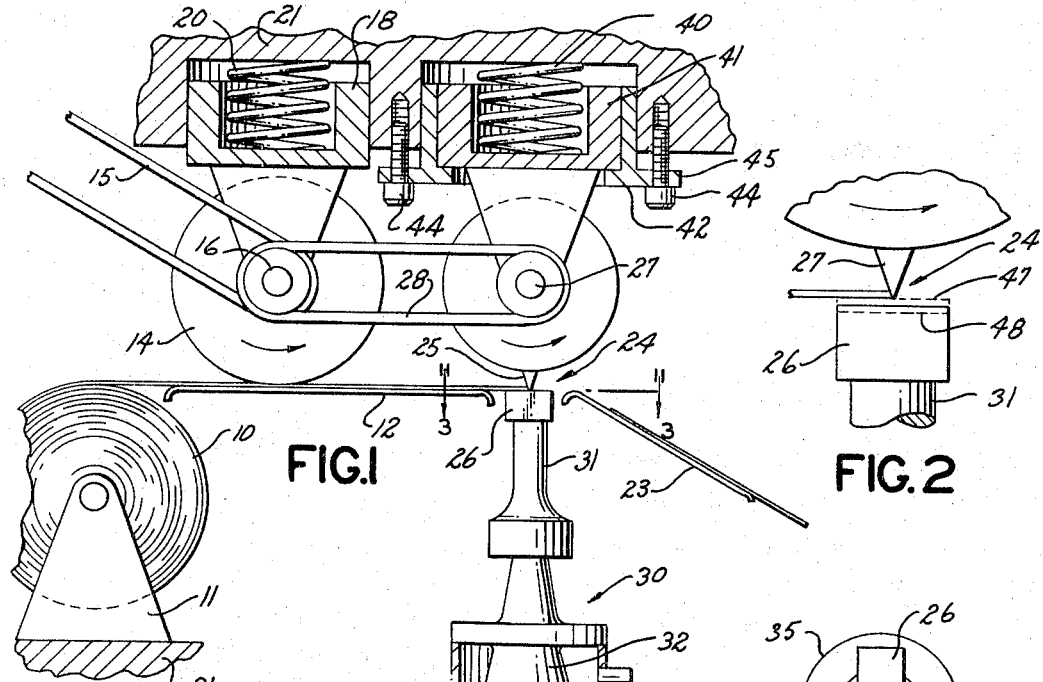

In the apparatus of FIG. 1 a roll of paper such as cigarette paper indicated at 10 and rotatably mounted on support 11 supplies a strip which is continuously fed along a supporting plate 12 by a feed roll 14. Feed roll 14 is power driven by a belt 15 and is rotatably mounted on shaft 16 carried from vertically slidable support 18. Spring 20, cooperating between base 21 and support 18, maintains roll 14 in firm driving engagement with the strip to be cut. Thus the paper strip from roll 10 is continuously fed to and through a cutting zone 24. From the cutting zone 24 the sheared segments are delivered through a receiving plate 23 to suitable handling means not shown. It will be apparent to those skilled in the art that other suitable feeding and receiving structure can be provided in association with the structure and cutting zone 24. At cutting zone 24 opposed cutting members are provided by a rotatable cutting blade 25 and relatively stationary support member 26. Blade 25 is supported for rotation about the axis of shaft 27 and is driven in timed relation with feed roll 14 through belt 28. Through this arrangement the tangential velocity of this cutting edge of blade 25 as it moves toward and departs from support 26 for cutting association with a strip fed thereacross is the same as the velocity of the moving strip so that there is no relative movement therebetween in the direction of feeding during the actual cutting operation.

Supporting member or anvil 26 is connected to an ultrasonic driving assembly 30 which includes an anvil holder 31, a suitably formed connecting body 32, and a magnetostrictive drive unit 34 housed within container 35. Windings 36 of assembly 30 are connectable to a suitable source of electrical energy at high frequencies to obtain ultrasonic vibrations of magnetostrictive assembly 34 and ultrasonic movements of anvil 26 toward and from cutting blade 25 through minute amplitudes. Thus such a vibration is superimposed upon the relative approach of cutting blade 25 and anvil 26 during a cutting operation.

Spring 40, cooperating between base 21 and slide 41 rotatably supporting a shaft 27 and cutting blade 25, acts to determine a maximum engaging force between cutting blade 25 and anvil 26 for safety purposes. Slide 41 is movable in a stop sleeve 42 which is adjustably positioned relative to base 21 through screws 44 passing through flange 45 on sleeve 42 and threaded within base 21.

Figure 2:
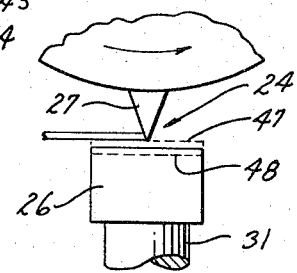
Figure 3:
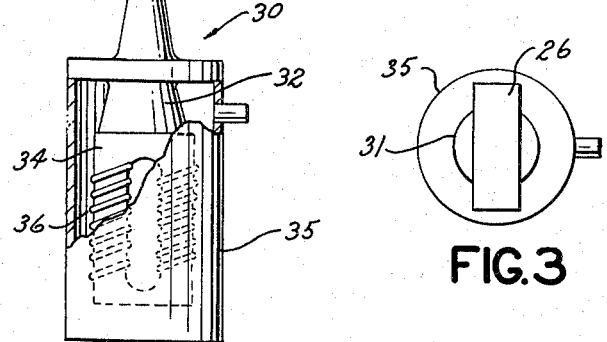

FIG. 2 is an enlarged fragment of FIG. 1 illustrating particularly the association of blade 27 and anvil 26 at the cutting zone 24. The excursion or movement of anvil 26 may be between dotted lines 47 and 48 and is substantially twice the thickness of the strip being cut. Thus with the upper surface of anvil 24 at its neutral position as shown in solid lines the strip could be pulled between blade 27 and the anvil. At the full forward extent of anvil 26 to line 47 the anvil surface would be flush with the blade as shown. If this forward excursion is greater due to improper adjustment of the apparatus components spring 40 will yield to determine a maximum engaging force and also to prevent damage to the apparatus. Stop sleeve 42 allows adjustment for this purpose.

In the embodiment of FIGS. 1 and 2 anvil 26 is mounted on magnetostrictive assembly 30 at an antinodal location and as magnetostrictive unit 34 is energized at ultrasonic frequencies the cutting action during relative approach of blade 27 and anvil 26 will be aided by the ultarsonic vibrations of anvil 26 and the strip supported thereby as the papers move toward and from blade during the excursion of the upper anvil surface.

Figure 4:
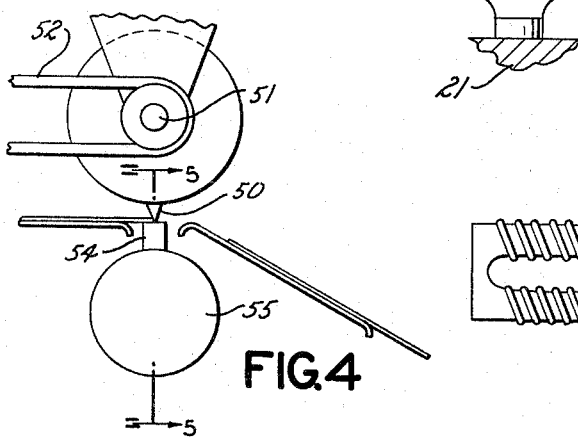
FIG. 4 illustrates a modified cutting arrangement.
Figure 5:
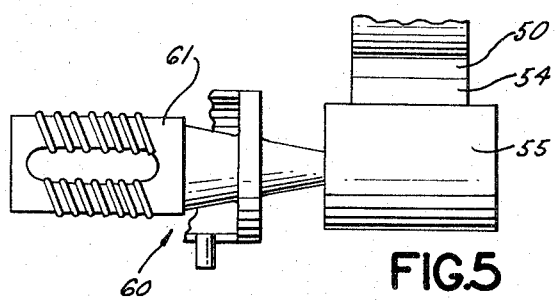
FIG. 5 is a view taken substantially along line 5—5 of FIG. 4.

In the embodiment of FIGS. 4 and 5 a similar feed is provided and a cutter blade 50 rotatably mounted on shaft 51 is driven by belt 52 in a manner as illustrated in FIG. 1. Shaft 51 is similarly and adjustably supported. Thus the feed and cutting movement of blade 50 is the same as that in the apparatus of FIGS. 1 and 2. The major distinction in this embodiment is that the supporting anvil 54 is mounted on a holder 55 with its supporting surface parallel to the line of basic vibrations of magnetostrictive drive assembly 60 similar to that of FIGS. 1 and 2. Blade 54 has its center point at a nodal location of assembly 60 which is driven by the magnetostrictive drive unit 61 included therein at the ultrasonic frequencies.

With blade 50 at a nodal location, its overall bodily movement would be substantially radial while its center point, as shown, would theoretically be subject solely to radial movements relative to assembly 60 while towards its ends a compound radial and endwise movement would be obtained with the endwise movement increasing. Thus a combination of movements of supporting anvil 54, and the strip carried thereby, are provided to aid the cutting operation in cooperation with knife 50.

Thus it is seen that a unique cutting apparatus has been provided wherein extremely high frequency oscillations of a cutting member are utilized in conjunction with the relative cutting approach to reduce cutting forces for more efficient cutting action and longer life of cutting components. The present apparatus is simple in design and construction for a long life in reliable operation.

While the forms of apparatus herein described constitute the preferred embodiments of the invention, it is to be understood that the invention is not limited to these precise forms of apparatus, and that changes may be made therein without departing from the scope of the invention which is defined in the appended claims.

What is claimed is:

1. Apparatus for cutting material comprising,
a rotatable cutting member,
an opposing non-rotatable support,
feed means for moving strip material across said support during a cutting operation,
said feed means including an operative connection to said cutting member for movement thereof into and out of association with said support at a tangential velocity equalling the feed rate,
and an ultrasonic drive unit connected to said support for vibration thereof relative to said cutting member at ultrasonic frequencies and minute amplitudes during a cutting operation.

2. Apparatus for cutting material comprising,
a base,
a cutting member supported on said base for rotation,
an opposing non-rotatable support,
feed means for feeding a strip of material to be engaged across said support,
drive means operatively connected to both said cutting members and said feed means for simultaneous operation thereof for feeding a strip of material continuously across said support during a cutting operation and at a rate equalling the tangential velocity of movement of said cutting member relative to said support,
a magnetostrictive driving unit,
means connecting said support to said driving unit for oscillation thereby,
said support extending perpendicular to the line of longitudinal vibration of said unit,
and exciting windings for said magnetostrictive unit for oscillation thereof at ultrasonic frequencies, whereby said support and the strip supported thereby are oscillated at ultrasonic frequencies and through minute amplitudes toward and from said cutting member during a cutting operation.

3. Apparatus for cutting material comprising,
a base,
a cutting member rotatably supported on said base,
an opposing support on said base,
feed means for continuously moving a strip of material across said supporting member during a cutting operation,
drive means operatively connected to both said feed means and to said rotatable cutting member for feeding movement of the strips of material across said support at a rate equalling the tangential velocity of said cutting member during its approach and departure therefrom,
a magnetostrictive drive unit,
means mounting said supporting member on said support extending parallel to the direction of longitudinal vibration thereof and with the center point of said cutting member at a nodal location therealong,
and exciting windings for driving said magnetostrictive unit at ultrasonic frequencies, whereby a strip of material to be cut is continuously fed across said supporting member and is driven at ultrasonic frequencies and through minute amplitudes during a cutting operation.

References Cited by the Examiner

UNITED STATES PATENTS

| | | | |
|---|---|---|---|
| 2,452,211 | 10/1948 | Rosenthal | 83—575 X |
| 2,092,268 | 4/1952 | Gerbe | 83—349 X |
| 2,730,103 | 1/1956 | Mackta | 83— 575 X |

ANDREW R. JUHASZ, *Primary Examiner.*